United States Patent [19]

Gates

[11] Patent Number: 5,065,566
[45] Date of Patent: Nov. 19, 1991

[54] TRIMMER ATTACHMENT FOR MOWING DECKS

[76] Inventor: David E. Gates, R.R. 5, Box 148B, Chillicothe, Mo. 64601

[21] Appl. No.: 629,646

[22] Filed: Dec. 7, 1990

[51] Int. Cl.⁵ .......................................... A01D 55/00
[52] U.S. Cl. ...................................................... 56/12.7
[58] Field of Search .................. 56/12.7, 10.1, 10.2, 56/10.4, 13.5, 13.6, 16.7, 16.9

[56] References Cited

U.S. PATENT DOCUMENTS 4,148,174  4/1979  Mathews et al. .................... 56/12.7
4,703,613  11/1987  Raymond ............................ 56/12.7

Primary Examiner—Thuy M. Bui
Attorney, Agent, or Firm—Kokjer, Kircher, Bowman & Johnson

[57] ABSTRACT

A flexible line trimmer attachment for a tractor driven mower deck for trimming around trees and other objects simultaneously with mowing. A pivotal boom projects laterally from the mower deck and carries one or more trimming heads which rotate flexible lines using motive power supplied by the tractor. The boom deflects when it encounters a tree and is able to trim around more than 180° of the tree circumference. A tension spring returns the boom to its normal lateral position after the tree has been cleared. The boom can be swung upwardly for compact storage by a power cylinder.

20 Claims, 3 Drawing Sheets

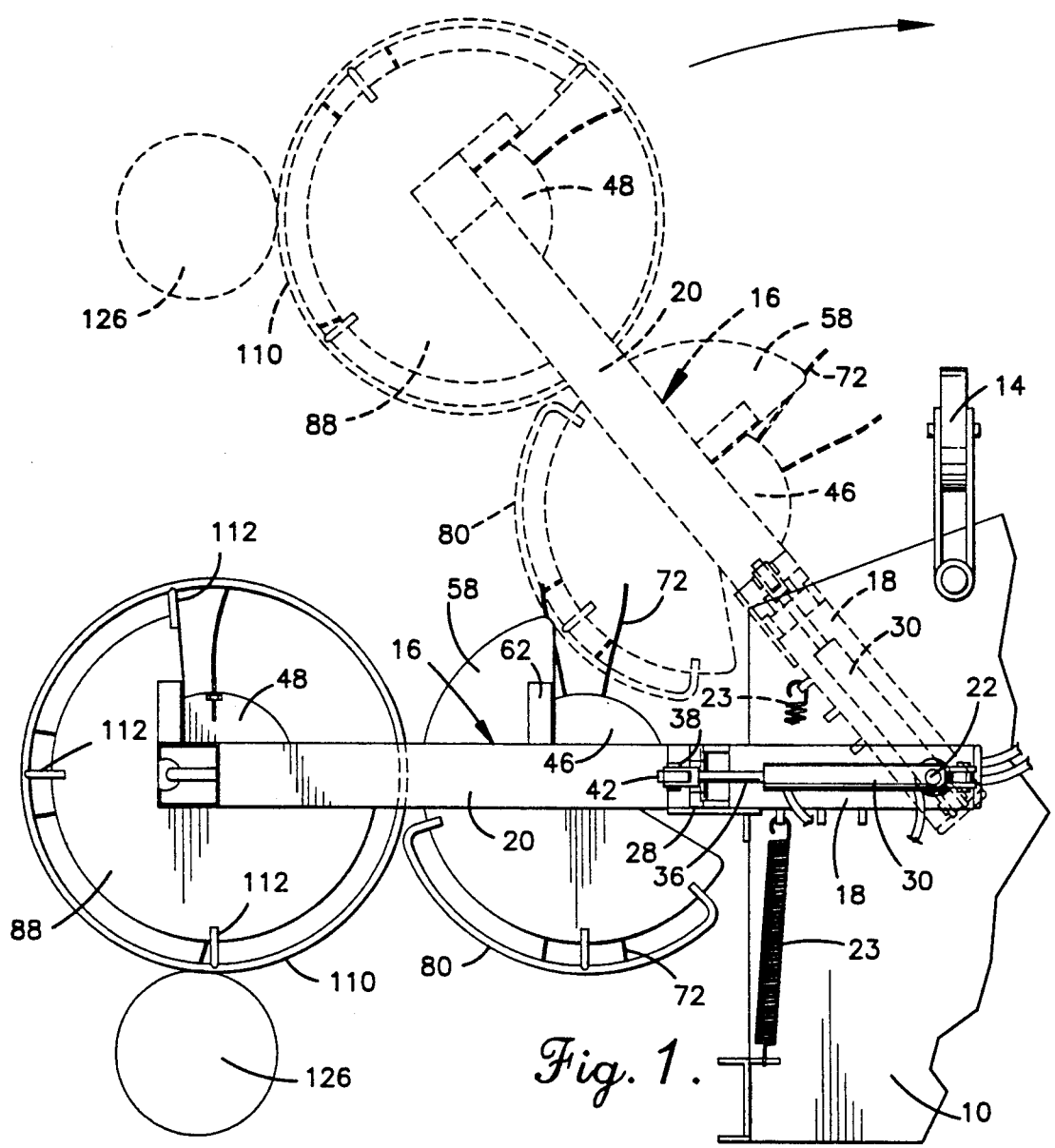
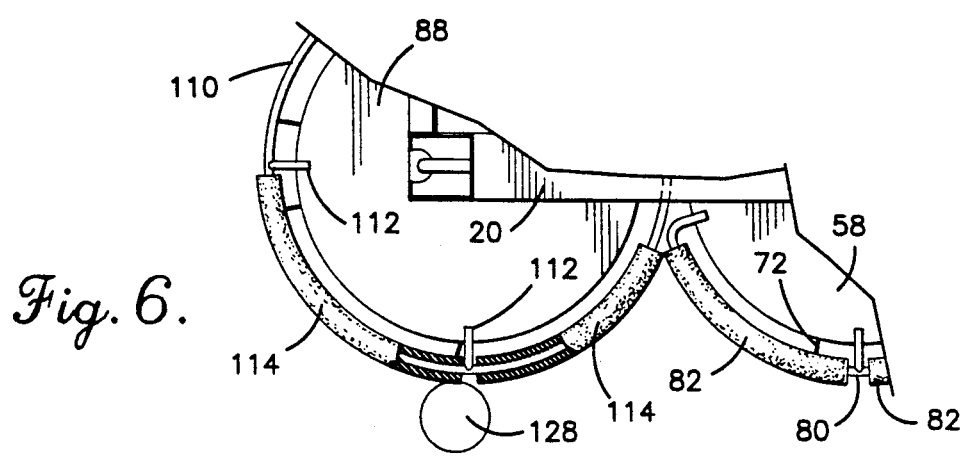
Fig. 1.
Fig. 6.

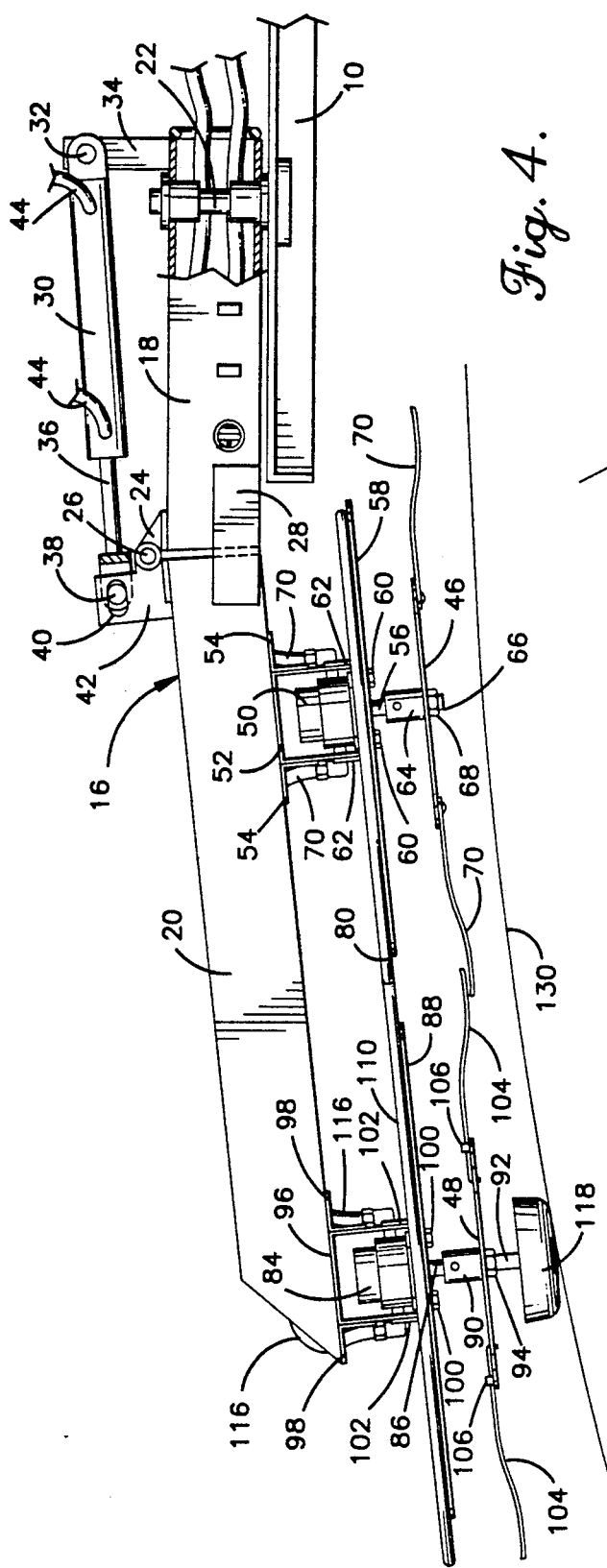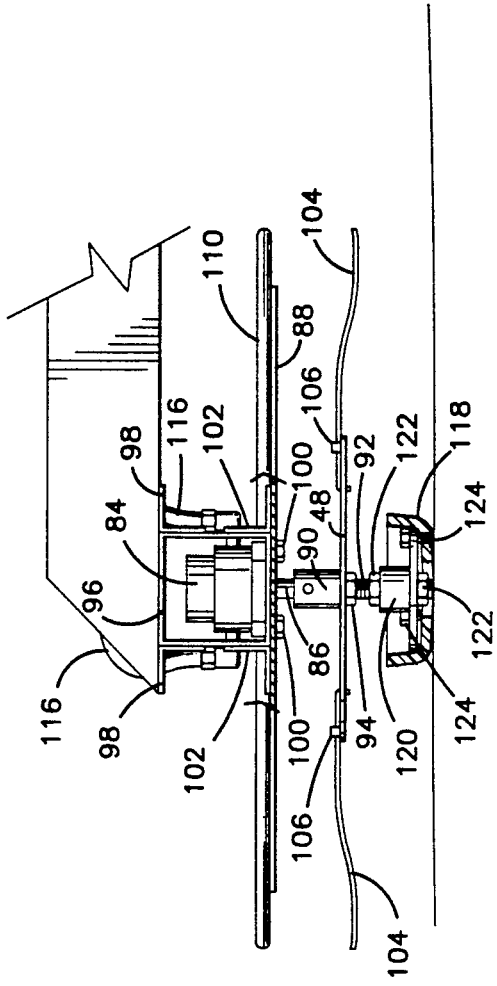

TRIMMER ATTACHMENT FOR MOWING DECKS

BACKGROUND AND SUMMARY OF THE INVENTION

This invention relates generally to mowing equipment and more particularly to a flexible line trimmer which may be attached to and used with a tractor driven mower deck to provide close trimming around trees and other obstructions.

The mowing of fields and other large tracts of land, including many lawns, is often carried out by using a tractor driven mowing deck. Although this type of equipment provides a wide mowing swath and thus covers large areas well, it is unable to trim closely around trees and other obstacles such as fence posts or bushes. Accordingly, hand held flexible line trimmers and other types of trimming devices are usually used separately for trimming around trees and the like. This can significantly increase the time and labor required to complete the job, especially in heavily treed areas or other areas having a large number of objects that require close trimming.

The present invention is directed to a flexible line trimmer attachment which operates to trim closely around trees and other obstacles at the same time as the mower deck is used for mowing. It is a particular object of the invention to provide a trimmer attachment which may be used with various makes and models of mowing decks and which neatly trims around obstacles without requiring precise maneuvering of the tractor. Another important object of the invention is to provide a trimmer attachment that may be provided either as original equipment attached to the mowing deck when it is sold or as an attachment that may be connected with an existing mowing deck. Another significant feature of the invention is the simplicity of the structure of the trimmer attachment and its ability to make use of the power system for the tractor of the mowing deck.

In accordance with the invention, a horizontal boom is pivotally attached at one end to the mowing deck of a tractor driven mower. The boom extends laterally to one side of the deck and can deflect about its pivot connection when it encounters an obstacle such as a tree. A return spring is provided to pivot the boom back to its normal laterally extending position as soon as the obstacle has been cleared.

A pair of trimming heads are carried on the boom. Each trimming head is equipped with a flexible trimming line that is driven by the trimming head in order to trim around trees and other objects when the trimming heads are driven by hydraulic or electric motors or another drive mechanism. An adjustable shoe on the bottom of one of the trimming heads controls the trimming height.

As the boom approaches an obstacle such as a tree, the trimming heads are able to trim right up to the tree. As the boom deflects pivotally when the tree is encountered, the trimming heads are able to trim along its side and even partially along the back side of the tree as the boom is clearing the tree and the return spring pivots the boom back to its lateral position. The pivotal mounting arrangement and return spring are thus important features of the invention which permit close trimming without the need for precise steering of the tractor or other tractor maneuvering that might interfere with the mowing function.

Another important feature of the invention is the construction of the boom in two sections which are hinged together. This permits the outboard boom section which carries the trimming heads to "float" up and down about the hinge axis when uneven terrain is being traversed, and it allows inclined areas to be trimmed evenly because the outboard boom section is automatically maintained parallel to the slope even if the tractor is on more horizontal terrain. The hinge construction of the boom also allows the outboard boom section to be raised to a storage position when the mowing deck is used without need for trimming or when the machine is being stored and a reduced width is desirable.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 1 is a fragmentary top plan view showing a tractor driven mowing deck equipped with a flexible line trimmer attachment constructed according to a preferred embodiment of the present invention, with the broken lines showing the boom of the trimmer attachment deflected by an obstacle;

FIG. 4 is a front elevational view similar to FIG. 2 showing the manner in which the outboard boom section is able to "float" about its hinge connection with the inboard boom section and with portions broken away for purposes of illustration;

FIG. 5 is a fragmentary front elevational view of the outer cutting head and the outboard end portion of the boom, with portions shown in section for purposes of illustration; and FIG. 6 is a fragmentary top plan view of the trimmer attachment showing padded sleeves mounted on the bumpers for the cutter heads.

DETAILED DESCRIPTION OF THE INVENTION

Figure 2:
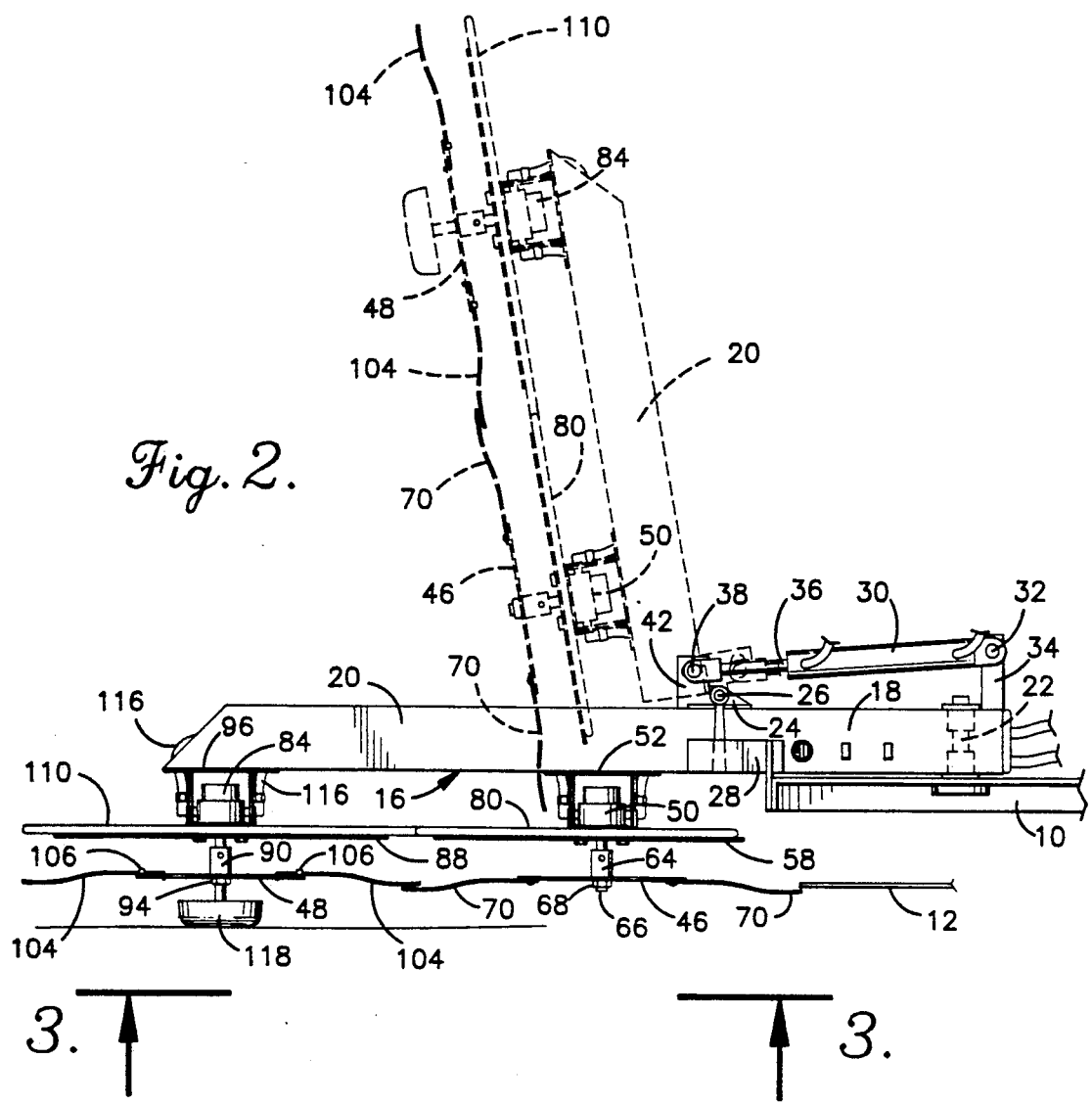
FIG. 2 is a fragmentary front elevational view of the mowing deck and trimmer attachment shown in FIG. 1, with the broken lines showing the outboard section of the boom raised to its storage position.

Referring now to the drawings in more detail and initially to FIGS. 1 and 2 in particular, numeral 10 designates a conventional mowing deck of a tractor driven mower. The mower includes a rotary cutting blade 12 which is located beneath the deck 10 and cuts a circular swath as the mower operates. The mowing deck 10 is equipped with caster type wheels 14 (one of which is shown in FIG. 1) which travel along the ground.

The present invention is directed to a flexible line trimmer attachment which is useful with a wide variety of tractor driven mowers. Accordingly, the particular construction of the mower deck is not a part of the present invention, other than that the trimmer attachment is intended for attachment to and use with a tractor driven mower.

The trimmer attachment includes a boom which is generally identified by numeral 16 and which includes a relatively short inboard section 18 and a longer outboard section 20. The inboard boom section 18 is pivotally connected to the top of the mowing deck 10 at one end. A vertical pivot pin 22 is used for the pivot connection, and the boom 16 is thus pivotally connected with the deck 10 such that it can pivot about the vertical axis of the pin 22. The boom 20 extends laterally to one side of the deck 10 and assumes a generally horizontal orientation when the mower is operated.

The pivotal mounting of boom 16 allows it to deflect about pin 22 when the boom encounters an obstacle such as a tree. A tension spring 23 continuously urges the boom to its laterally extending position. The spring is hooked to boom 16 at one end and to the mowing deck 10 at its other end. When the boom is in its normal lateral position, the return spring 23 is relaxed. When the boom deflects to the rear as shown in broken lines in FIG. 1, spring 23 is placed under tension to oppose the deflection.

The inboard and outboard boom sections 18 and 20 are connected end to end by a hinge 24 which permits the outboard section 20 to pivot up and down relative to the inboard section 18 about a generally horizontal hinge pin 26 which forms the hinge axis of the hinge 24. The adjacent ends of the boom sections 18 and 20 are spaced apart slightly so that the outboard boom section 20 can move downwardly about the hinge pin 26 such that its outer end is below its inner end, as shown in FIG. 4. A plate 28 secured to the inboard boom section 18 spans the gap between the two boom sections to strengthen the structure of the boom 16.

The hinge construction of the boom also permits the outboard boom section 20 to be raised about the axis of the hinge pin 26 to the storage position shown in broken lines in FIG. 2. In this position, the outboard boom section 20 has a generally vertical orientation such that the trimmer attachment projects laterally only a short distance beyond the deck 10.

The outboard boom section 20 may be raised to and lowered from the storage position by a hydraulic cylinder 30. The base end of the cylinder 30 is pivotally pinned at 32 to a bracket 34 which projects upwardly from the inner end of the inboard boom section 18. As best shown in FIG. 4, the cylinder 30 has a piston rod 36 equipped with a horizontal pin 38 at its outer end. The pin 38 fits loosely through a slot 40 which is formed in a bracket 42 mounted on the outboard boom section 20. The loose fit of the pin 38 in slot 40 provides enough play in the connection between the piston rod 36 and the outboard boom section 20 to permit the outboard boom section to pivot up and down to a limited extent without obstruction from the hydraulic cylinder 30.

Hydraulic fluid is supplied to cylinder 30 through hoses 44 which connect with the existing hydraulic system of the tractor and are equipped with a conventional valve (not shown) that controls the extension and retraction of the piston rod 36. The rod 36 is normally in the extended position shown in FIG. 4 and in solid lines in FIG. 3. Then, the outboard boom section 20 is in a generally horizontal orientation and essentially forms an outward continuation of the inboard boom section 18. When the rod 36 is retracted, the outboard boom section 20 is raised to the storage position shown in broken lines in FIG. 2, and the cylinder thereafter holds the outboard boom section in its raised position until the rod 36 is extended again.

The outboard boom section 20 is equipped with a pair of trimming heads which take the form of metal disks 46 and 48. As best shown in FIG. 4, the inner disk 46 is driven by a hydraulic motor 50 which is mounted in a metal housing 52 secured to the underside of boom section 20 near its inner end. A pair of angle members 54 reinforce the connection between the housing 52 and the boom section 20. Motor 50 drives a rotary output shaft 56 which extends through the center of a shield 58 which overlies disk 46 and is secured to the bottom of the housing 52 by bolts 60 or other fasteners. Angle members 62 reinforce the connection between the shield 58 and the underside of housing 52.

Below the shield 58, shaft 56 connects with and drives a hub 64. A stud 66 is threaded through the center of disk 46 and into hub 64. A nut 68 is threaded onto stud 66 and tightened against the bottom of the disk 46 in order to mount the disk such that it rotates when shaft 56 is driven by the motor 50. The hydraulic motor 50 is supplied with hydraulic fluid through hoses 70 which extend to the motor through the boom 16 and connect with the existing hydraulic system of the tractor. A conventional control valve (not shown) is used to control the on/off condition of the motor 50.

The disk 46 is equipped with four flexible trimming lines, two of which are identified by numeral 70 and the other two of which are identified by numeral 72. The lines 70 and 72 may be nylon thread of the type conventionally used in flexible line trimmers, or they may be another type of line that is suitable for trimming around obstacles such as trees or bushes.

Figure 3:
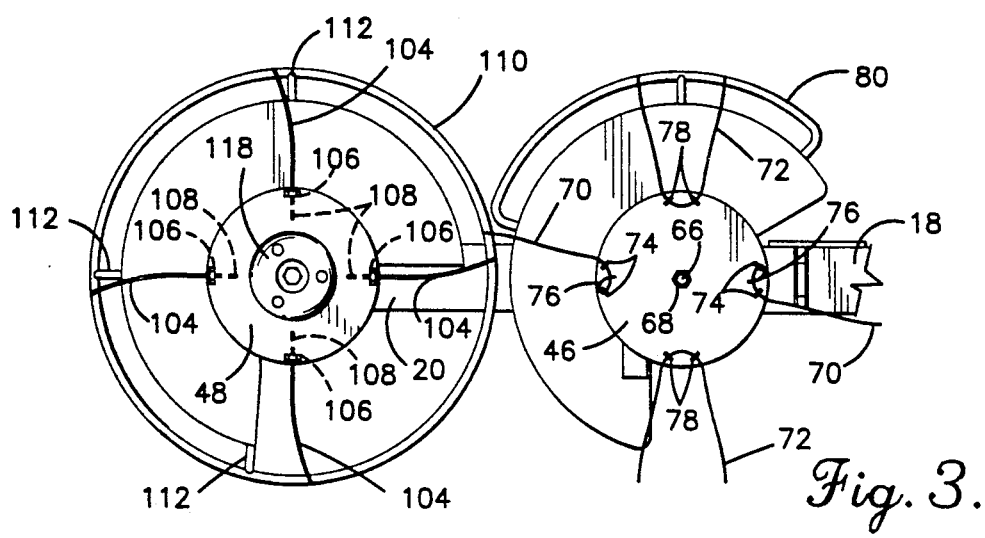
FIG. 3 is a fragmentary bottom plan view taken generally along line 3—3 of FIG. 2 in the direction of the arrows.

As shown in FIG. 3, the two lines 70 are diametrically opposed to one another on the disk 46 and are connected with the disk in the same way. Each line 70 is threaded through a pair of spaced apart eyes 74 projecting from the underside of disk 46. The short end of each line 70 is then looped back on itself as indicated by the loops 76 which are adjacent to the disk 46. In this manner, the lines 70 are attached to the cutting head 46 such that they project radially outwardly from the disk.

The other two lines 72 are also diametrically opposed to one another and are connected with the disk 46 by extending them through additional pairs of eyes 78 such that both end portions of each line 72 project outwardly well beyond the perimeter of the disk 46 and in a generally radial direction. In this manner, each of the lines 72 is connected to the trimming head disk 46 and effectively provides a pair of trimming lines formed by the opposite end portions of the line.

It should be noted that the two different ways in which the lines 70 and 72 are connected with the disk 46 may be used to connect all of the lines, and additional ways of connecting the lines may be used as well. Also, the four lines 70 and 72 are preferably spaced equidistantly around the perimeter of the disk 46. Even though four lines are illustrated, it is to be understood that a different number of lines may be employed.

As best shown in FIG. 2, the swath defined by the lines 70 and 72 is adjacent to the swath of the blade 12, and the two swaths preferably overlap slightly. With additional reference to FIGS. 1 and 3, the shield 58 preferably takes the form of a circular disk having a pie shaped sector removed from its back inside portion. The shield 58 substantially covers the leading portion of the swath defined by the flexible trimming lines 70 and 72. The leading edge portion of the shield 58 is equipped with a curved bar 80 that leads the shield 58 as the trimmer attachment moves through a field or other area that is being mowed and trimmed. As shown in FIG. 6, sleeves 82 may be fitted around the bar 80 to serve as cushions that prevent damage to delicate trees or other objects that may be struck by the bar. The sleeves 82 may be constructed of rubber hosing or any other relatively soft material that can serve as an effective bumper.

The outer trimming head disk 48 is mounted and equipped in a similar manner to the inner disk 46. Referring to FIG. 4, a hydraulic motor 84 drives an output shaft 86 which extends through a shield 88 and connects with a hub 90. A stud 92 extends through the center of the disk 48 and is threaded into the hub 90. A nut 94 is threaded onto the stud 92 and tightened against the disk 48 in order to secure the disk to the hub 90 so that the disk rotates when the motor 84 drives its output shaft 86.

The motor 84 is mounted in a square housing 96 secured to the outer end of the outboard boom section 20. Angle members 98 are provided to reinforce the connection between the boom section 20 and the housing 96. The shield 88 is connected by bolts 100 to the bottom of the housing 96, and angle members 102 reinforce the connection between the shield 88 and the motor housing 96.

With particular reference again to FIG. 3, the outer trimming disk 48 is equipped with four flexible trimming lines 104 which may be nylon cord or another suitable material The lines 104 extend radially from the periphery of the disk 48 and are spaced equidistantly around the perimeter of the disk. Each line 104 is threaded through an eye 106 located on top of the disk 48. The inner ends of the lines 70 are then bent and fitted in openings 108 formed through the disk 48. The openings 108 are oriented at 90° to the eyes 106, and this arrangement securely attaches the lines 104 to the trimming head disk. The cutting swath defined by the lines 104 overlaps slightly with the swath of the lines 70 and 72 on the inner trimming head.

It should be noted that the lines 104 can be connected in other ways, including the ways described for the lines 70 and 72.

The shield 88 is preferably a circular disk having a sector on its trailing inside portion removed. A curved bar 110 forms a bumper for the shield 88 and preferably extends completely around the peripheral edge of the shield. Short bars 112 may be used to connect the bar 110 with the shield 88. As shown in FIG. 6, the leading portion of the bar 110 may be equipped with soft sleeves 114 which serve as bumpers for protecting delicate trees and the like. The shield 88 preferably substantially covers the leading portion of the swath defined by the flexible lines 104.

The motor 84 is supplied with hydraulic fluid through hoses 116 which extend through the boom 20 and receive fluid from the hydraulic system of the tractor. A conventional control valve (not shown) is provided in order to control the on/off condition of the motor 84. Preferably, all of the control valves are located in proximity to the operator station of the tractor so that they are readily accessible to the operator.

As shown best in FIG. 5, the stud 92 of the outer trimming head assembly carries a shoe 118 which travels along the ground in order to set the height of the trimming head disk 46 and 48. A bearing 120 is secured to the bottom end of the stud 92 by a pair of nuts 122. The shoe 118 is in turn secured to the bearing by screws 124. By loosening the nut 94, the stud 92 can be thread into or out of hub 90 to move the shoe 118 up or down on the stud 92, thus adjusting the distance of the sole of the shoe below the overlying disk 48 as well as the other disk 46. In this manner, the height of the disks 46 and 48 can be adjusted in order to adjust the trimming height.

In operation, the trimmer attachment acts to trim grass, weeds and the like at the same time as the blade 12 operates to mow the grass and weeds. The boom 16 normally extends laterally in the position shown in solid lines in FIG. 1. When the hydraulic motors 50 and 84 are activated, the cutting head disks 46 and 48 spin so that the flexible lines 70, 72 and 104 act to trim whatever is within their swaths.

If a tree such as the tree 126 shown in FIG. 1 is encountered by the boom, the bar 110 (or the padded sleeves 114) engage the back part of the tree as shown in solid lines in FIG. 1. The trimming lines 104 preferably define a swath that extends to the bar 110, and the lines are thus able to trim right up to the front portion of the tree 126. As the tractor continues forward, the boom 16 is caused to deflect about its pivotal mounting pin 22, as depicted in broken lines in FIG. 1. As the outer cutting head moves around the inside edge portion of the tree 126, it is able to trim closely up to the tree along its side. As soon as the bar 110 has cleared the tree 126, the return spring 23 returns the boom 16 to its normal lateral position. As the outer cutting head clears the tree 126, it is able to trim even up to part of the back edge portion of the tree and is able to trim along well over 180° of the circumference of the tree.

When the mower makes another pass in the opposite direction on the opposite side of the tree 126, the trimmer attachment is able to easily trim around the remaining portion of the tree in the same fashion, and the entire circumference of the tree is thus closely trimmed as the mower makes two adjacent passes which encompass the tree. The mowing deck can be away from the tree by any distance within the span of the boom 16 during either pass.

The soft sleeves 82 and 114 are preferably used if delicate obstacles are expected to be encountered during trimming operations. For example, with reference to FIG. 6, if a relatively small tree such as a delicate fruit tree 128 will be encountered, the sleeves 114 are preferably used in order to avoid damaging the tree. Similarly, if gravestones or the like are expected to be encountered, the sleeves are preferably used in order to avoid damaging them.

It should be noted that an obstacle may be encountered by virtually any part of either bar 80 or 110. Regardless of where the obstacle is located along the length of the boom 16, the boom is able to deflect, and the trimming lines are able to closely trim around more than 180° of the obstacle during each pass, so that two normal passes is all that is required to completely trim around the obstacle while normal mowing takes place. Consequently, the trimmer attachment provides automatic close trimming around virtually any obstacle that might be encountered without the need for the operator of the tractor to accurately steer in order to achieve effective trimming around obstacles.

It should also be noted that the length of the boom 16 and the size of the trimming heads can vary depending upon the application that is expected. If large trees are expected to be encountered, the trimming heads should be relatively large in order to assure that the entire circumference of the tree will be trimmed. Conversely, if only small obstacles are expected to be encountered, then the trimming heads can be smaller if desired.

The length of the boom 16 may also be varied. However, since the trimming heads can be operated even when obstacles are not encountered, they act to increase significantly the width of each pass of the mower in open areas. By way of example, the outboard boom section may be more than two feet long, and this increases the mowing swath by over two feet, thus decreasing the number of passes that need to be made to complete the mowing operation. Even though the boom 16 is equipped with two trimming heads, it should be noted that virtually any number of trimming heads can be provided. However, for most normal mowing operations, two cutting heads are desirable.

The shoe 118 travels on the surface of the ground that is being traversed and thus controls the height of the trimming head disks 46 and 48. As best shown in FIG. 4, the hinge construction of the boom allows even sloping ground such as the inclined surface 130 to be trimmed in a relatively even manner because the outboard boom section 20 is able to "float" about the hinge pin 26 and thus remain generally parallel even to the inclined surface 130.

When the trimmer attachment is not needed for trimming or when the mower is in storage, the outboard boom section 20 may be raised to the storage position shown in FIG. 2. This raises it well above the ground and also reduces the width presented by the trimmer attachment so that the machine can be stored in a smaller area. There is no manual effort required to raise or lower the outboard boom section, as this function is performed by the hydraulic cylinder 30.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A trimmer attachment for a tractor driven mower deck, comprising:
   a boom;
   means for connecting said boom to extend generally horizontally from the mower deck in a manner permitting the boom to pivot about a substantially vertical pivot axis between a normal position wherein the boom extends generally laterally to one side of the deck and a deflected position wherein the boom is deflected rearwardly from the normal position when the boom encounters an obstacle;
   yieldable means for urging the boom toward its normal position to return the boom to the normal position after an obstacle is cleared;
   flexible line trimming means on said boom comprising a trimming head mounted for rotation on the boom and a flexible trimming line on the trimming head for trimming weeds and the like when the trimming head is rotated; and
   power means for effecting rotation of the trimming head.

2. The trimmer attachment of claim 1, wherein said boom comprises:
   an inboard section for connection to the mower deck;
   an outboard section carrying said trimming means thereon; and
   hinge means for connecting said outboard section with said inboard section in a manner permitting the outboard section to swing up and down relative to the inboard section about a substantially horizontal hinge axis to facilitate traversing of sloping terrain by said trimming means.

3. The trimmer attachment of claim 2, including means for raising said outboard section of the boom about said hinge axis to a storage position wherein said outboard section has a generally vertical orientation.

4. The trimmer attachment of claim 3, wherein said raising means comprises a power cylinder having extended and retracted conditions and opposite ends pinned to the respective inboard and outboard boom sections.

5. The trimmer attachment of claim 4, wherein one of the ends of the cylinder has a loosely pinned connection to its boom section to accommodate limited up and down swinging of the outboard boom section about said hinge axis.

6. The trimmer attachment of claim 1, including a ground engaging shoe on said boom for travel along the ground, said shoe being located below the trimming head to set the height of the trimming head above the ground.

7. The trimmer attachment of claim 6, including means for adjusting the distance between the shoe and trimming head to adjust the height of the trimming head above the ground.

8. The trimmer attachment of claim 1, wherein:
   said trimming line has a preselected swath; and
   said trimming means includes a shield mounted on said boom above the trimming head, said shield substantially covering the leading portion of said swath.

9. The trimmer attachment of claim 8, wherein:
   said shield has a leading edge; and
   said shield includes a bumper located beyond said leading edge for contact with obstacles encountered by the boom.

10. The trimmer attachment of claim 9, including a relatively soft pad on said bumper.

11. The trimmer attachment of claim 8, wherein:
   said power means comprises a motor mounted on said shield and driving a shaft; and
   said trimming head is carried on and rotatively driven by said shaft.

12. The trimmer attachment of claim 11, including a ground engaging shoe on said shaft at a location below the trimming head, said shoe traveling on the ground to set the height of the trimming head above the ground.

13. The trimmer of claim 1, wherein said trimming means comprises:
   a second trimming head mounted on the boom for rotation at a location spaced laterally from the first mentioned trimming head; and
   a flexible trimming line on said second trimming head defining a swath overlapping the swath of the first mentioned line.

14. The trimmer attachment of claim 1, wherein:
   said trimming head presents a pair of eyes; and
   said trimming line is threaded through said eyes to attach the line to the trimming head.

15. The trimmer attachment of claim 14, wherein said trimming line includes a pair of end sections projecting outwardly from the respective eyes and both effective to trim weeds and the like.

16. The trimmer of claim 14, wherein said line is passed through both eyes and looped back on itself at a location adjacent the trimming head.

17. The trimmer of claim 1, wherein:
said trimming head presents an eye and an opening angled relative to one another; and
said trimming line is threaded through said eye and bent into said opening to attach the line to the trimming head.

18. A combination mowing and trimming machine, comprising:
a tractor driven mower deck having a rotary cutting blade;
a boom extending generally laterally from one side of said mower deck in a generally horizontal orientation and connected with the deck for movement about a substantially vertical pivot axis to permit the boom to deflect about said pivot axis when an obstacle is encountered by the boom;
return spring means for effecting pivotal movement of the boom about said pivot axis back to a laterally extending position after the obstacle has been cleared;
a trimming head mounted on said boom for rotation and having a flexible trimming line projecting therefrom for trimming weeds and the like upon rotation of the trimming head, said line defining a swath laterally adjacent to the swath of said blade; and
power means for rotating said trimming head.

19. The machine of claim 18, including:
inboard and outboard sections of said boom hinged together end to end with the inboard section connected to the mower deck and the outboard section being pivotal about a generally horizontal hinge axis to a raised storage position wherein the outboard section has a generally vertical orientation; and
power means for raising and lowering said outboard section about said hinge axis.

20. The machine of claim 18, including:
a second trimming head mounted on the boom for rotation at a location spaced laterally from the first mentioned trimming head; and
a flexible trimming line on said second trimming head defining a swath overlapping the swath of the first mentioned line.

* * * * *